July 27, 1954     C. H. HOEPPNER     2,685,079

FLUTTER COMPENSATION MEANS FOR RECORDING SYSTEMS

Filed Feb. 7, 1951     2 Sheets-Sheet 1

INVENTOR
CONRAD H. HOEPPNER
BY
ATTORNEY

July 27, 1954   C. H. HOEPPNER   2,685,079
FLUTTER COMPENSATION MEANS FOR RECORDING SYSTEMS
Filed Feb. 7, 1951   2 Sheets-Sheet 2

INVENTOR
CONRAD H. HOEPPNER
BY Elmer J. Gorn
ATTORNEY

Patented July 27, 1954

2,685,079

UNITED STATES PATENT OFFICE

2,685,079

FLUTTER COMPENSATION MEANS FOR RECORDING SYSTEMS

Conrad H. Hoeppner, Waltham, Mass., assignor to Raytheon Manufacturing Company, Newton, Mass., a corporation of Delaware Application February 7, 1951, Serial No. 209,901

5 Claims. (Cl. 340—184)

1

This invention relates to means for compensating for flutter in recordings.

In using tape recorders for telemetering data, variations in the recorder and play-back speed result in spurious signals commonly known as flutter or wow. These speed variations may be due to imperfect mechanical motion, variation in the speed of the primary drive, or changes in the dimension of the recording medium. These spurious signals are particularly important when the recorded and reproduced signals are in the form of variations in a sub-carrier frequency over narrow limits such as seven and one-half per cent of the center frequency in accordance with the information to be communicated. This is true because flutter is a relatively slow variation in the speed of the tape past the head. As this speed is one of the factors that determines the frequency of the signal reproduced, any variation in it will produce a variation in the frequency of the signal reproduced. This variation is usually only a small percentage of the signal frequency, say, two to three per cent. However, in narrow and FM telemetering, this is a relatively large percentage, about thirty per cent of the maximum frequency variation caused by the signal, approximately seven and one-half per cent. Thus flutter becomes a serious problem in this method of recording and reproducing telemetering signals.

Previous efforts to correct for such flutter have used a signal reference sub-carrier that is higher than any of the signal sub-carrier frequencies used. This reference carrier is mixed with the signal sub-carriers and recorded by means of the same recording head that records the signal sub-carriers. The pick-up head reproduces these mixed sub-carriers which are then separated out by band pass filters, one for the reference sub-carrier and one for each of the signal sub-carriers. The output of each filter is separately fed to its own discriminator to obtain a slowly varying D. C. representing either the flutter alone or, in the case of the signal sub-carriers, the information as modulated by the flutter. The output of the flutter sub-carrier is inverted in polarity by a device such as a vacuum tube. The output of the inverter is mixed with the output of each of the signal sub-carriers. As it is proportional to the flutter and equal to, but opposite in phase to, the flutter component in the output of the signal sub-carrier discriminators, it will cancel out the flutter component of the output of these discriminators leaving the signals free of flutter to be passed on to the indicators.

2

However, this system requires the use of frequency for the reference sub-carrier quite different from that of any of the signal sub-carriers. Due to the well-known fact that any recording and play-back system passes different frequencies with different efficiencies, the frequency of the reference sub-carrier will be attenuated differently from that of the other sub-carriers. If the reference signal is fed back to each mixer at the same level, it might not be equal to the flutter component but may tend to over, or under, correct for the flutter component in the output of each channel. This must be avoided by applying a different amount of attenuation or amplification to that portion of the flutter correction signal applied to each channel so as to obtain the right compensation.

Furthermore, should the flutter frequency change sharply, it will produce a transient that will be reproduced differently by each channel as far as phase is concerned. This will mean that unless phase correction of the proper amount is introduced into the flutter correction output before it is mixed with the output of each signal channel, the correction signal will not be exactly equal and opposite in phase to the flutter component in each signal channel at all times as it should be to give proper correction.

The present invention avoids this difficulty by introducing a separate reference sub-carrier for each channel at the center frequency of its associated channel. These reference sub-carriers are recorded and reproduced by a single set of recording and reproducing heads separate from the set used for the signal channel sub-carriers. After reproduction the various reference frequencies are separated by band pass filters and fed through separate channels to a discriminator. The output of each channel is inverted in an appropriate device as before and then mixed with the output of its corresponding signal channel discriminator, the signal sub-carriers having been similarly separated into their separate channels by filters and the signal recovered by discriminator action. As before, the mixer operates to cancel out the flutter component in the transmitted signal.

With this system, due to the fact that the reference channel and its associated signal channel are both adjusted for the same central frequency, there will be no need for the attenuation and delay equipment and its adjustment as required by the older circuit. Thus, while in the system of the present invention additional frequency generators and channels for the reference sub-carriers are needed, their design and adjustment is so much simpler that there is an over-all saving in time and expense, both on initial installation and maintenance over that for the older system.

The foregoing and other advantages, objects and features of the invention will be better understood from the following description taken in conjunction with the accompanying drawings, wherein:

Fig. 5 is a block diagram of the flutter compensation system according to the present invention.

Figure 1:
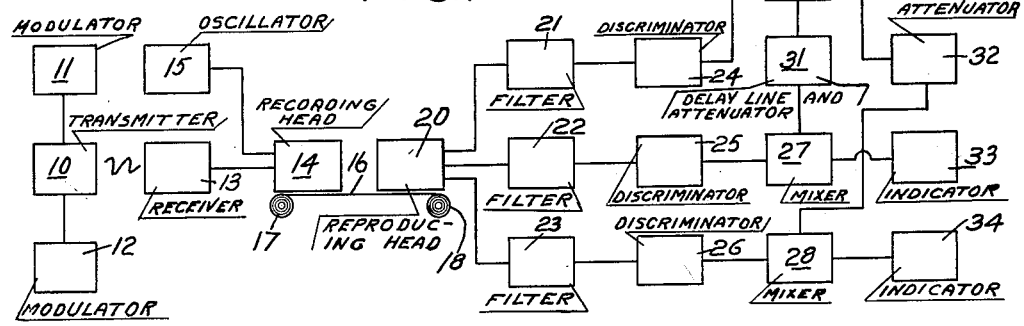
Fig. 1 is a block diagram of the old form of flutter compensation.

In the known system shown in Fig. 1, reference numeral 10 represents a transmitter of information to be recorded. It is modulated by modulators 11 and 12 with sub-carriers which are themselves modulated with the information to be recorded. The transmitter and modulators are of any convenient known design. The energy transmitted by the transmitter 10 is received by a receiver 13 which recovers the sub-carriers and feeds them to the recording head 14 which also receives the unmodulated output of an oscillator 15 having a frequency sufficiently different from that of any of the modulated sub-carriers so that it may be easily separated from them.

The recording head records the frequencies it receives on the tape 16 which is carried past the head by spools 17 and 18 and other well-known equipment not shown. The recorded frequencies are reconverted to electrical energy by reproducing head 20 positioned over the tape 16 by appropriate means.

The output of the reproducing head 20 is fed into a series of band pass filters; one, 21, is tuned to the reference frequency and the others, 22 and 23, are tuned to the frequencies of the various sub-carriers. The output of each filter 21, 22 or 23 is fed to a frequency discriminator 24, 25 or 26. The output of each of the discriminators 25 and 26 representing the information on one of the sub-carriers is fed to a mixer 27 or 28. The output of the discriminator 24 is fed to an inverter stage 30. The inverter 30 reverses the polarity of the output of the discriminator 24. The signal is then fed through combined time delay line and attenuators 31 and 32, one for each signal channel, to the associated mixer 27 or 28. The purpose of these delay lines and attenuators will be explained later. The result is to balance out any component or flutter in the sub-carrier channels and deliver to the indicating devices 33 and 34 the information desired substantially free of flutter.

Figure 4:
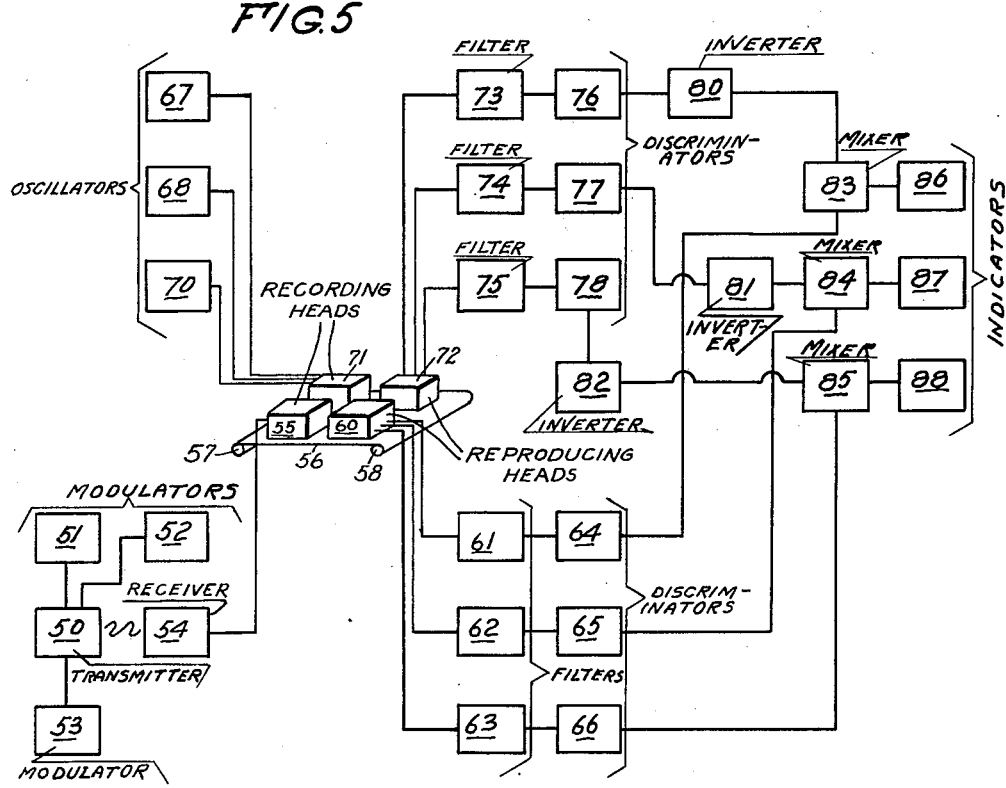
Fig. 4 is a graph illustrating how the flutter is compensated.
Figure 4:
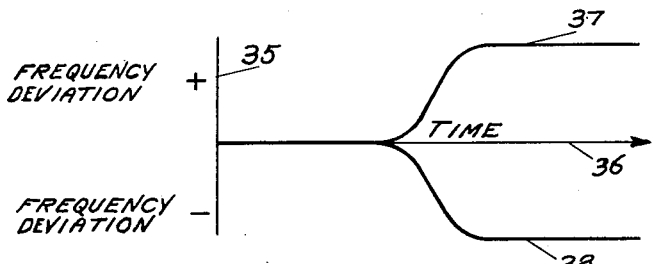

How this compensation is accomplished is shown in Fig. 4. This is a plot of the frequency deviation with respect to time in a possible system of this type. The frequency deviation is represented by displacement along the vertical axis 35 and time by displacement along the horizontal axis 36. The line 37 represents the flutter component of the sub-carrier and the line 38 represents the flutter recovered from the reference carrier. It will be seen that the resultant will be zero deviation if the flutter signal is exactly equal and opposite in phase to the flutter component of the sub-carrier signal.

Figure 2:
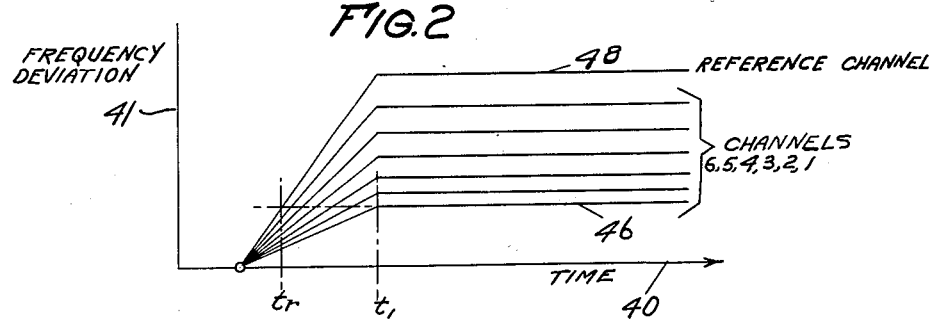
Fig. 2 is a graph showing the response of different channels to the flutter component.

In a system such as that shown in Fig. 1, there may be any convenient number of sub-carriers. Each sub-carrier will be at a different frequency separated from the others by an interval determined by the expected frequency deviation. Fig. 2 shows the response of the recording and reproducing system to a change in each of the frequencies of a system having six sub-carriers and a control frequency modulated only by flutter. Time is represented by the horizontal coordinate 40 and frequency deviation by the vertical coordinate 41.

Figure 3:
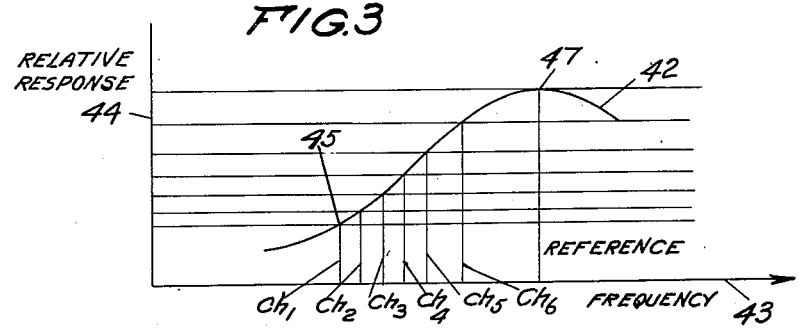
Fig. 3 shows the frequency response curve of a typical magnetic recording reproduction system such as may be used with the present invention.

Fig. 3 shows a typical frequency characteristic curve 42 of a recording and reproducing system of the type customarily used in telemetering systems. Frequency is represented by displacement along the horizontal coordinate 43 and relative response by displacement along the vertical coordinate 44. It will be seen that sub-carrier 1 will be transmitted with a relative amplitude represented by the point 45 in Fig. 3 which corresponds to a discriminator output level 46 in Fig. 2. Similarly, the reference frequency will be transmitted with a relative amplitude represented by point 47 in Fig. 3 and corresponding to discriminator output level 48 in Fig. 2. Thus it will be seen that the same amount of flutter will be represented by different discriminator outputs in each channel. To compensate for this, attenuation must be introduced into the output of the inverter before it is applied to the input of the mixer in each channel. This attenuator must be carefully adjusted to give the proper attenuation for its particular channel.

By reference to Fig. 2, it will be seen that, if the output 48 of the inverter 30 is reduced to the level 46 of channel 1, it will reach that level at a time $t_r$ earlier than the time $t_1$ when the output of the discriminator 25 reaches that level. Thus the correction takes place before it is needed. It will be seen that this time difference becomes less as the sub-carrier frequency becomes greater or closer to that of the reference channel. To correct this condition delay must be introduced in the output of the converter 30 before it is introduced into each of the mixers for a channel having a lower frequency sub-carrier. Furthermore, the amount of this delay must be adjusted to a different value for each channel. This obviously makes for a system that is difficult to design, adjust and maintain.

These difficulties are overcome in the system of the present invention shown in Fig. 5 where reference character 50 represents a transmitter. This transmitter is modulated by sub-carriers which are in turn modulated by the desired information in modulators 51, 52 and 53. The energy transmitted by the transmitter 50 is received by the receiver 54 and fed into a recording head 55 that records the variations of all of the sub-carriers on the tape 56 carried by reels 57 and 58 past the recording head 55 and reproducing head 60. The output of the reproducing head 60 is fed to filters 61, 62 and 63, each tuned to the central frequency of a different sub-carrier. The output of each filter is fed to a discriminator 64, 65 or 66.

Oscillators 67, 68 and 70 produce energy at reference frequencies equal to the central frequencies of each sub-carrier. These frequencies are fed into a recording head 71 which records these frequencies, together with whatever flutter may be in the system, on to tape 56.

These recorded frequencies as modified by flutter are converted to electrical energy by pick-up head 72 and fed to filters 73, 74 and 75, one for each channel. As before, the output of each filter is fed to a discriminator 76, 77 or 78. The output of each discriminator 76, 77 or 78 is fed to an inverter 80, 81 or 82. The output of each inverter 80, 81 or 82 is fed to a mixer 83, 84 or 85 which also receives the output of the discriminator 64, 65 or 66 of its respective signal channel. As in the earlier system, the output of each mixer is free of a component of flutter and is fed to an indicator device 86, 87 or 88 of any convenient type, such as a recording oscillograph. All the component equipment used in this system may be of standard, well-known design and so has not been shown in detail.

It will be seen by reference to Figs. 2 and 3 that, as the reference frequency is the center frequency of the sub-carrier channel it is associated with, it will be attenuated and delayed by the same amount as the sub-carrier frequency in going through the system and so no additional attenuation and delay need to be introduced between the inverters and the mixers of the various channels as are necessary in the earlier system. The elimination of these attenuator and delay circuits and their adjustment has been found to more than make up for the cost of the additional reference frequency generators and channels and the additional set of recording and reproducing heads. The result is a more reliable and also cheaper system.

While this invention has been described in terms of a preferred embodiment utilizing magnetic recording and reproduction, any form of recording and reproduction ending with electrical energy may be used in carrying out this invention.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In a recording and reproducing system for a plurality of information channels having different predetermined bandwidths of frequencies with frequency variations within the band constituting the information, means for compensating for the frequencies introduced into the system by the recording and reproducing equipment, comprising means for producing a reference frequency for each information channel within the bandwidth of each associated information channel, means for recording and reproducing the frequencies of the information channels and the reference frequencies, means for deriving an electrical potential proportional to the frequency variations of each of the information channels and reference frequencies, and means for mixing the voltages derived from the reference frequencies in reverse polarity with the voltages derived from the associated information channels to obtain a voltage proportional to the original information with spurious signals introduced by the recording and reproducing system deducted.

2. In a recording and reproducing system for a plurality of information channels having different predetermined bandwidths of frequencies with frequency variations within the band constituting the information, means for compensating for the frequencies introduced into the system by the recording and reproducing equipment, comprising means for producing a reference frequency for each information channel within the bandwidth of each associated information channel, means for recording and reproducing the frequencies of the information channels and the reference frequencies, means for separating each information channel and reference frequency together with its modulation, means for deriving an electrical potential proportional to the frequency variations of each of the information channels and reference frequencies, and means for mixing the voltages derived from the reference frequencies in reverse polarity with the voltages derived from the associated information channels to obtain a voltage proportional to the original information with spurious signals introduced by the recording and reproducing system deducted.

3. In a recording and reproducing system for a plurality of information channels having different predetermined bandwidths of frequencies with frequency variations within the band constituting the information, means for compensating for the frequencies introduced into the system by the recording and reproducing equipment, comprising means for producing a reference frequency for each information channel within the bandwidth of each associated information channel, magnetic means for recording and reproducing the frequencies of the information channels and the reference frequencies, said recording and reproducing means having a first set of recording and reproducing heads for the information channels and a second set of recording and reproducing heads for the reference frequencies, means for deriving an electrical potential proportional to the frequency variations of each of the information channels and reference frequencies, and means for mixing the voltages derived from the reference frequencies in reverse polarity with the voltages derived from the associated information channels to obtain a voltage proportional to the original information with spurious signals introduced by the recording and reproducing system deducted.

4. In a recording and reproducing system for a plurality of information channels having different predetermined bandwidths of frequencies with frequency variations within the band constituting the information, means for compensating for the frequencies introduced into the system by the recording and reproducing equipment, comprising a source of a plurality of carrier frequencies each modulated with information, means for recording and reproducing said modulated carriers, means for separating each information carrier together with its modulation, means for demodulating each carrier, means for generating electrical energy at a plurality of reference frequencies each one equal to the central frequency of one of the information channels, means for recording these reference frequencies with a second recording means on the same recording medium as the carriers, means for reproducing these frequencies from the record medium, means for separating each reference frequency, means for deriving from these reference frequencies a voltage proportional to the frequency modulation introduced by the recording and reproducing system into the reference frequencies, means for inverting the polarity of these voltages, and mixing means to utilize these inverted voltages to compensate for the frequency variation introduced into the carriers by the recording and reproducing system.

5. In a recording and reproducing system for a plurality of information channels having different predetermined bandwidths of frequencies with frequency variations within the band constituting the information, means for compensating for the frequencies introduced into the system by the recording and reproducing equipment, comprising a source of a plurality of carrier frequencies each frequency modulated with information, magnetic means for recording and reproducing said modulated carriers, band pass filter means for separating each reference frequency together with its modulation, frequency discriminator means for demodulating each information carrier, oscillator means for generating electrical energy at a plurality of reference frequencies each one equal to the central frequency of one of the information channels, magnetic means for recording these reference frequencies with a second recording means on the same recording medium as the carriers, magnetic means for reproducing these reference frequencies from the record medium, band pass filter means for separating each reference frequency, frequency discriminator means for deriving from these reference frequencies a voltage proportional to the frequency modulation introduced by the recording and reproducing system into the reference frequencies, electron discharge device means for inverting the polarity of these voltages, and mixing means to utilize these inverted voltages to compensate for the frequency variation introduced into the carriers by the recording and reproducing system.

References Cited in the file of this patent

UNITED STATES PATENTS

| Number | Name | Date |
|---|---|---|
| 2,444,676 | Roberts et al. | July 6, 1948 |
| 2,494,370 | Swartzel | Jan. 10, 1950 |